United States Patent [19]
Herickhoff

[11] Patent Number: 5,427,439
[45] Date of Patent: Jun. 27, 1995

[54] SURFACE MINING CONVEYOR SYSTEM

[75] Inventor: James A. Herickhoff, Fort Collins, Colo.

[73] Assignee: Atlantic Richfield Company, Plano, Tex.

[21] Appl. No.: 259,645

[22] Filed: Jun. 14, 1994

[51] Int. Cl.⁶ .................. E21C 47/04; E21C 41/26
[52] U.S. Cl. ........................... 299/64; 299/18; 299/19
[58] Field of Search ............... 299/10, 18, 19, 64

[56] References Cited

U.S. PATENT DOCUMENTS

| | | | |
|---|---|---|---|
| 4,150,852 | 4/1979 | McCoy | 299/19 X |
| 4,261,119 | 4/1981 | Kubo et al. | 299/18 X |
| 4,486,049 | 12/1984 | Lubrich et al. | 299/18 X |

OTHER PUBLICATIONS

*Mining Engineering,* "Portable Crusher for Open Pit and Quarry Operations", Dec. 1960, pp. 1271–1274.
*Coal Age* "Three Innovations at C&K Coal", Sep. 1981, pp. 83–89.

*Primary Examiner*—David J. Bagnell
*Attorney, Agent, or Firm*—Michael E. Martin

[57] ABSTRACT

A surface mining system for mining successive, generally parallel cuts in a coal or similar mineral seam includes at least one endless belt conveyor disposed on a spoil pile directly adjacent the cut being excavated and a second conveyor extending from the first conveyor to a material storage site. Material is transferred to the first conveyor by an excavator working the longitudinal extent of the cut and transferring excavated material to a moveable crusher and conveyor apparatus which transfers the material to a second moveable crusher and conveyor apparatus. The second moveable crusher and conveyor apparatus discharges material onto the conveyor disposed on the spoil pile. The mineral seam may be mined by progressively advancing into the seam with successive parallel cuts and progressively moving the conveyor system onto newly formed portions of the spoil pile. A combination conveyor and crusher apparatus is arranged such that the conveyor and crusher unit are mounted on an undercarriage in counterbalancing relationship to each other.

11 Claims, 2 Drawing Sheets

SURFACE MINING CONVEYOR SYSTEM

BACKGROUND OF THE INVENTION

1. Field of the Invention

The present invention pertains to a surface mining system and method which utilizes an arrangement of conveyors which are advanced over the spoil as a mineral seam is mined by making plural, generally parallel surface cuts.

2. Background

Surface or strip mining operations are generally carried out using a combination of material haulage and conveying equipment to extract minerals such as coal, for example, from successive elongated "cuts" in a mineral seam. Certain mineral seams may be of such quality as to preclude use of certain types of mining processes and still yield a profit on the mining operation. For example, truck haulage from the point of excavation of the mineral to a loading point of further transportation away from the mine or to certain processing equipment at the mine is often more labor and capital intensive than certain types of conveyor systems. Truck haulage is often more flexible than other types of haulage systems and permits certain processing equipment such as crushers or grinders to be located at a central point near a storage facility or the point of loading the produced mineral into rail cars or other modes of transport upon removal from the mine site.

However, if portable processing equipment can be provided wherein, for example, the particle size of the excavated ore or mineral material may be reduced prior to conveyance by conventional continuous belt conveyors, this type of transport system can be attractive. Moreover, in accordance with the features of the present invention, a substantially continuous mining operation may be carried out with transport of the mined material by conveyors which are placed on and advanced over the overburden spoil pile so that material may be conveyed directly to a storage facility for loading onto transport vehicles for departure from the mine site. The above-mentioned problems as well as certain other difficulties in developing efficient surface mining have been overcome with the surface or strip mining system of the present invention.

SUMMARY OF THE INVENTION

The present invention provides a surface or strip mining method and system for mining an outcropping or seam of coal or similar mineral value wherein the material being mined is excavated from the earth, processed at the excavation site to reduce the particle size of the material and conveyed to a storage facility remote from the excavation site substantially entirely by continuous conveyor means.

In accordance with an important aspect of the present invention, a surface mining system is provided which includes an excavator which removes material from the earth and which material is loaded directly into certain processing equipment, such as crushing or particle size reduction equipment, in one or more stages. The processed material is conveyed to a storage site remote from the mining site by conveyors arranged in such a way that, as substantially parallel cuts of the mined material are sequentially excavated, the conveyors are advanced over spoil piles extending both parallel to the longitudinal extent of the cut and normal to the cut.

In accordance with another important aspect of the present invention, there is provided a surface mining system which includes portable conveyor and processing apparatus which is advanceable with the excavating apparatus while remaining in material conveying communication with an arrangement of continuous conveyors supported on the overburden "spoil" material. The portable conveyor apparatus may include a material processing or crushing device associated with the conveyor.

The present invention also contemplates the provision of a portable conveyor apparatus which includes a processing apparatus mounted on-board in counterbalancing relationship to a somewhat cantilever supported conveyor extending at a relatively steep angle from one side of the apparatus. The cantilever conveyor apparatus also advantageously includes a telescoping discharge chute for discharging material onto one of the above-mentioned continuous conveyors.

The present invention still further contemplates an arrangement of belt or similar type continuous conveyors which includes an extensible conveyor in communication with a storage facility and at least two opposed "wing" conveyors extending normal to the first mentioned conveyor and in communication therewith by a suitable material transfer hopper or chute.

Those skilled in the art will recognize the above-mentioned features and advantages of the present invention together with other superior aspects thereof upon reading the detailed description which follows in conjunction with the drawing.

DESCRIPTION OF A PREFERRED EMBODIMENT

Figure 1:
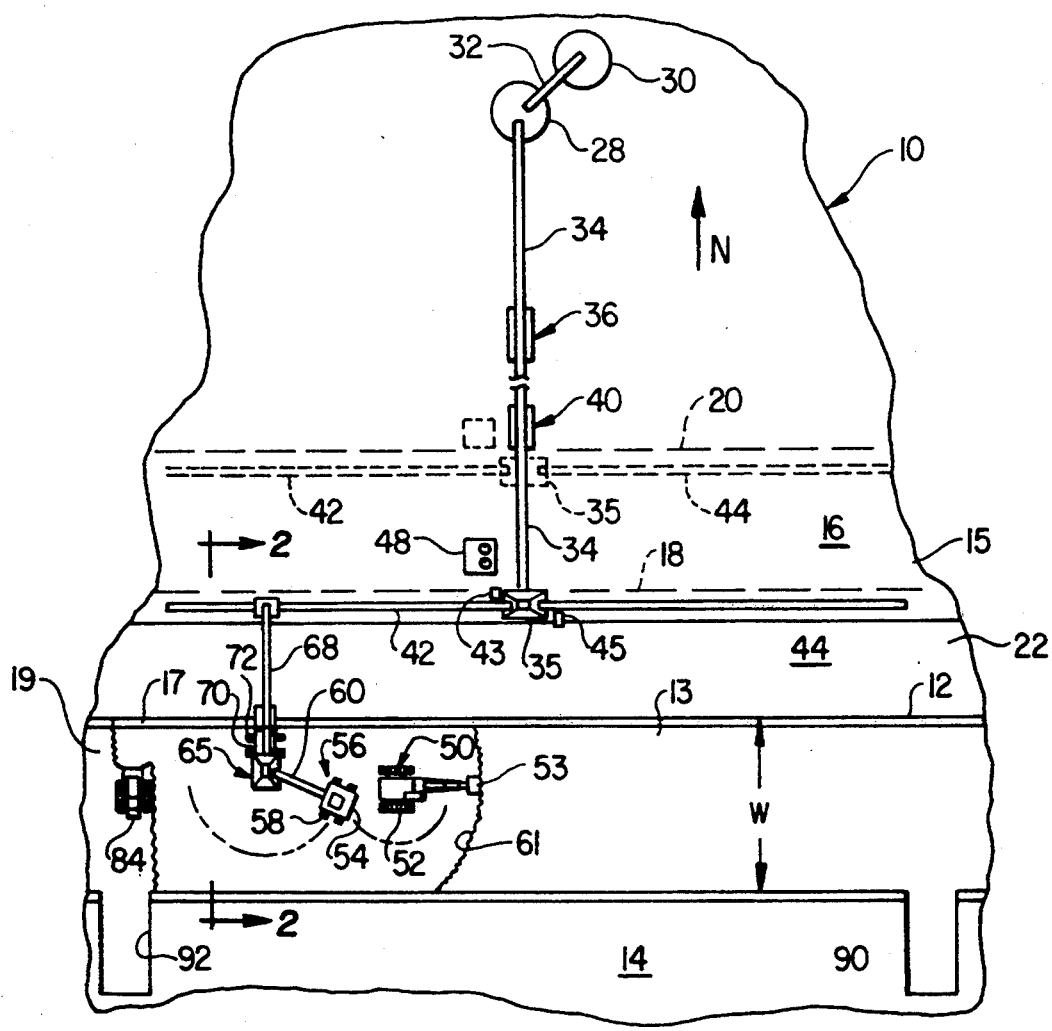
FIG. 1 is a plan view, in somewhat schematic form, of the surface mining system of the present invention.

In the description which follows, like elements are marked throughout the specification and drawing with the same reference numerals, respectively. The drawing figures are not necessarily to scale and certain elements are shown in generalized or schematic form in the interest of clarity and conciseness.

Figure 2:
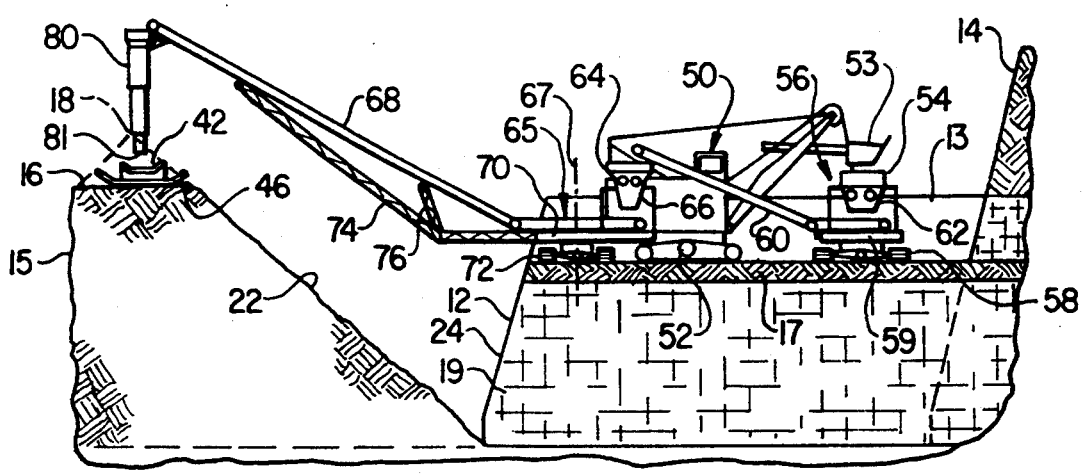
FIG. 2 is a side elevation taken substantially along the line 2—2 of FIG. 1 showing certain features of the apparatus of the surface mining system.

Referring to FIG. 1, there is illustrated a plan view of a portion of a surface mine generally designated by the numeral 10. The mine 10 is being worked to remove material such as coal from a seam 12 which has been uncovered of overburden material indicated generally at 14. Overburden material which has been removed to uncover the seam 12 has been deposited on a spoil pile 15 which, preferably, has been graded to have a generally flat, horizontal top surface 16 between previously formed peaks 18 and 20 indicated by the dashed lines of FIG. 1. The spoil pile 15 also is delimited by a sloping wall 22, see FIG. 2 also, which slopes to a point adjacent to the coal seam 12. The seam 12 has been prepared to remove coal material from a portion thereof, see FIG. 2, known as a "cut" wherein material that has been uncovered, by removal of overburden material 14 and placement thereof on the spoil pile, may then be excavated and transported to a suitable storage or loading facility for transport to a designated point of use or storage remote from the mine site. As shown in FIG. 2, the "cut" to be excavated from the coal seam 12 is designated generally by the numeral 24 and may comprise a continuous vertically extending layer of coal or may comprise a seam having a layer of coal 13 and a layer of coal 19 between which is disposed a relatively thin layer of overburden material or low-quality coal 17, for example.

For the sake of discussion herein, the direction arrow N in FIG. 1 indicates North and thus, the coal seam 12 extends East and West a predetermined extent, not indicated in FIG. 1, and also in a southerly direction so that subsequent cuts of a predetermined width, and corresponding generally to the width W of the cut of the coal seam 12 which has been exposed in FIG. 1, may be made by excavating the coal and transporting same to suitable storage facilities. An advantageous arrangement of a surface mining system for the mine 10 is illustrated in FIGS. 1 and 2. The mine 10 may have suitable storage facilities such as high-rise silo type buildings 28 and 30, as shown in FIG. 1. The silos 28 and 30 may be interconnected by an endless belt type conveyor 32 for transfer therebetween of coal or other suitable particulate mineral being mined in accordance with the system and method of the invention. The conveyor 32, as well as other belt conveyors described hereinbelow, may be of conventional design and of a type described, for example, in SME Mining Engineering Handbook, Volume 2, published by the American Institute of Mining, Metallurgical and Petroleum Engineers, Inc., New York, N.Y.

Figure 3:
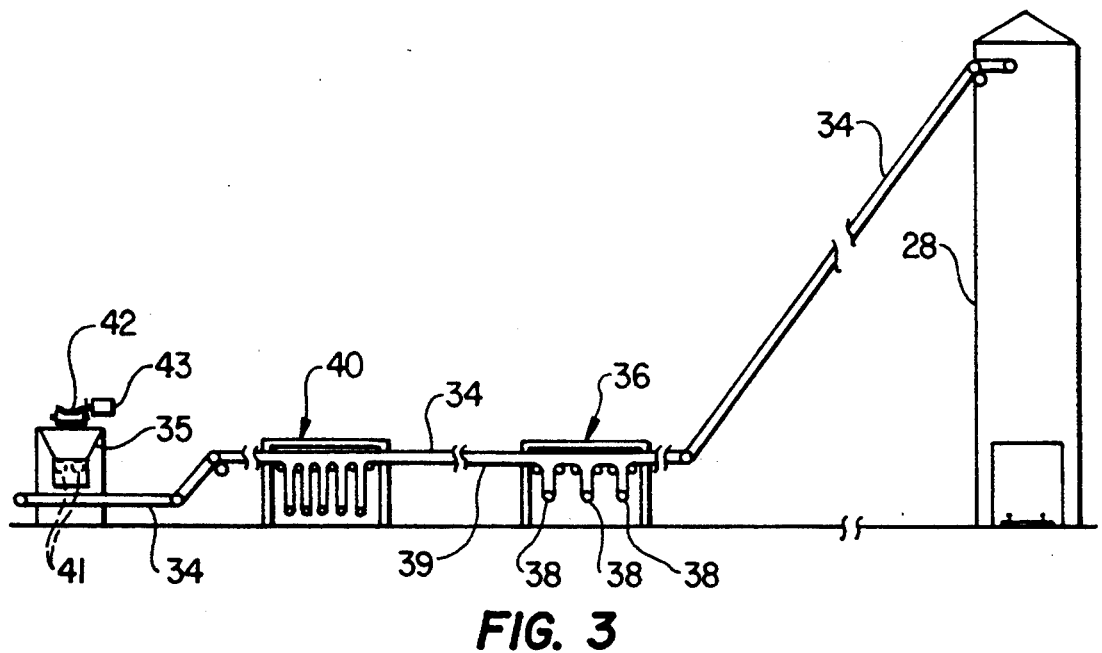
FIG. 3 is a side elevation, in somewhat schematic form, of an extensible continuous conveyor arrangement for conveying material to a storage facility.

Coal is conveyed to the silos 28, 30 by a second endless belt type conveyor 34 which extends in a generally North-South direction to a material-receiving hopper 35, FIG. 1. The conveyor 34 is also illustrated in FIG. 3 as having a suitable drive mechanism, generally designated by the numeral 36, which may include one or more drive pulleys 38 drivingly connected to the endless belt 39 of the conveyor 34. The drive pulleys 38 may each be drivenly connected to a suitable drive motor, not shown. The conveyor 34 may also include a so-called belt storage unit 40, FIGS. 1 and 3, wherein excess belting is stored for linear extension of the conveyor in a southerly direction, viewing FIG. 1, when required, without replacement of the belt or without needing to add a new section thereto. The belt storage unit 40 may be of a type commercially available.

As shown in FIG. 3, the material receiving hopper 35 may also include material particle size reducing or crushing rollers 41 of a known type and operably driven by means, not shown, to reduce the particle size of material conveyed to the receiving hopper by opposed endless belt type conveyors shown in FIGS. 1 and 2 and generally designated by the numerals 42 and 44, respectively. The conveyors 42 and 44 may also be of a type similar to the conveyor 34 and each suitably mounted on a skid or sub frame 46, see FIG. 2, whereby the conveyors 42 and 44 may be shifted laterally to selected positions. FIG. 1, for example, indicates a previous position of the conveyors 42 and 44, as well as the receiving hopper 35, adjacent to a previously formed peak 20 of the spoil pile 15 before formation of the peak 18 of the spoil pile. The conveyors 42 and 44 are each provided with suitable electrical drive motors 43 and 45, FIG. 1, and electrical power may supplied to the drive motors 43 and 45, as well as to the aforementioned drive means for the crushing rollers 41 from a portable electrical substation 48 whereby electrical power at a suitable voltage may be provided as required for operations.

Referring further to FIGS. 1 and 2, coal excavated from the seam 12 is transported to the conveyors 42 and 44 by a unique arrangement of apparatus and a unique method associated therewith. In particular, the coal seam 12 is excavated to remove the layers of coal 13 and 19 by conventional excavating equipment such as a crawler mounted excavating shovel 50, shown in FIGS. 1 and 2. The shovel 50 is of conventional construction and is supported on a crawler undercarriage 52. The excavating shovel 50 has a suitable boom mounted dipper 53 which is operable to excavate coal from the seam 12 and deposit same in a hopper 54 of a combination conveyor and primary particle size reduction or crusher apparatus 56. The apparatus 56 comprises a crawler undercarriage 58 on which is supported an endless belt conveyor 60 and a suitable, conventional particle size reduction or crushing unit 62. The crushing unit 62 and the conveyor 60 are supported by a frame 59 which is disposed on the undercarriage 58, see FIG. 2.

As indicated in FIG. 1, the apparatus 56 is operable to move with or independent of the shovel 50 with respect to the mining face 61 of the layer 13. The apparatus 56 is also disposed adjacent to a material-receiving hopper 64 of a secondary particle size reduction or crushing apparatus 65 which is also provided with a suitable endless belt conveyor or the like 68. The conveyor 68 is operable to convey coal to one or the other of the conveyors 42 and 44. The apparatus 65 includes a suitable crusher 66 which is disposed on and to one side of a frame 70 which is supported on a suitable crawler undercarriage 72, for example, see FIG. 2, due to the extended, somewhat cantilever portion of the conveyor 68 on an opposite side of the frame 70 including support trusses 74 and 76. The material-receiving hopper 64 and crusher 66 are advantageously mounted opposite a centerline 67 of the undercarriage 72 with respect to the conveyor 68 to counterbalance the weight of the conveyor and its supports 74 and 76.

The conveyor 68 also includes a telescoping material discharge chute 80 disposed over the conveyor 42 for discharging material directly onto the conveyor 42. As the material of the coal seam 12 is mined by the shovel 50 in concert with the apparatus 56 and 65, the apparatus 65 will move lower relative to the elevation of the top of the spoil pile 15. Accordingly, the discharge chute 80 may be telescoped to maintain a predetermined distance between the discharge end 81 of the chute and the conveyor 42.

As the shovel 50 removes the layer of material 13 and transfers same to the apparatus 56, the intermediate layer of overburden 17 may be removed by suitable means such as a crawler tractor mounted scraper or bulldozer 84, FIG. 1, which may push the layer of overburden into the pit area between the layer of material 19 and the spoil pile 15. This action will uncover the layer 19 of coal, or similar material, which may be excavated during a return advance of the shovel 50 as well as the apparatus 56 and 65 over the seam 12, moving from East to West.

The general method of mining in accordance with the present invention is believed to be understandable from the foregoing description. However, briefly, once the seam 12 has been uncovered of overburden 14 and a spoil pile such as the pile 15 has been formed and provided with a somewhat flattened top surface 16, as indicated, the shiftable skid-mounted conveyors 42 and 44 are moved into the positions shown in FIGS. 1 and 2 from the previous position indicated in FIG. 1, for example. In like manner, the conveyor 34 is suitably extended by adding a section of support framing therefor in a conventional manner to place the receiving hopper 35 in a position in alignment with the conveyors 42 and 44. Starting from a westernmost position, viewing FIG. 1, the shovel 50 will commence mining the seam 12 by removing the layer 13 of coal and depositing same in the hopper 54 of the apparatus 56 whereby a primary crushing or particle size reduction operation may be carried out. The material deposited in the hopper 54 will be processed and continuously conveyed by the conveyor 60 to the hopper 64 of the secondary crushing apparatus 65, if desired. Alternatively, the material conveyed by the conveyor 60 may be deposited directly onto the conveyor 68 for transportation to the conveyor 42, the hopper 35 and the conveyor 34 to the storage silos 28, 30.

Excavation of coal by the shovel 50 will progress easterly to remove the layer 13 while the overburden layer 17, if present, is pushed aside to expose the coal layer 19 so that, upon a return pass of the apparatus 50, 56 and 65 from an eastern position to a westerly position, the layer 19 may be mined. Alternatively, as the apparatus 50, 56, and 65 reach the eastern end of the conveyor 44, this equipment may be suitably traversed from its easternmost position to a westernmost starting position for removal of the layer 19 by traversing up and down respective earthen haul road ramps 90 and 92, FIG. 1. Moreover, as shown in FIG. 1, as the shovel 50 excavates the layers 13 and 19 and moves from the edge of the seam 12 toward the overburden high wall 14, the apparatus 56 may be moved to maintain a suitable position in relationship to the shovel 50 and the apparatus 65.

The excavating shovel 50 is, of course, mounted on a suitable swing platform to permit excavating material from the seam 12 and loading the hopper 54 without requiring frequent movement of its undercarriage 52. The undercarriages 58 and 72 may not be required to be of a crawler type and may, in fact, merely be suitable skids which may be moved by suitable tractors or the like, not shown, to their working positions when changes in such positions are required. In like manner, the conveyors 42 and 44 may not be required to be mounted on skids or the like but should otherwise be sufficiently portable to be moved in a southerly direction as successive cuts of the coal seam 12 are uncovered and excavated. Thanks to the arrangement of the system of the present invention, the conveyors 42, 44 and 34 may be advanced with advancement of mining the seam 12 by moving the conveyors to newly formed portions of the spoil pile as they develop.

Figure 4:
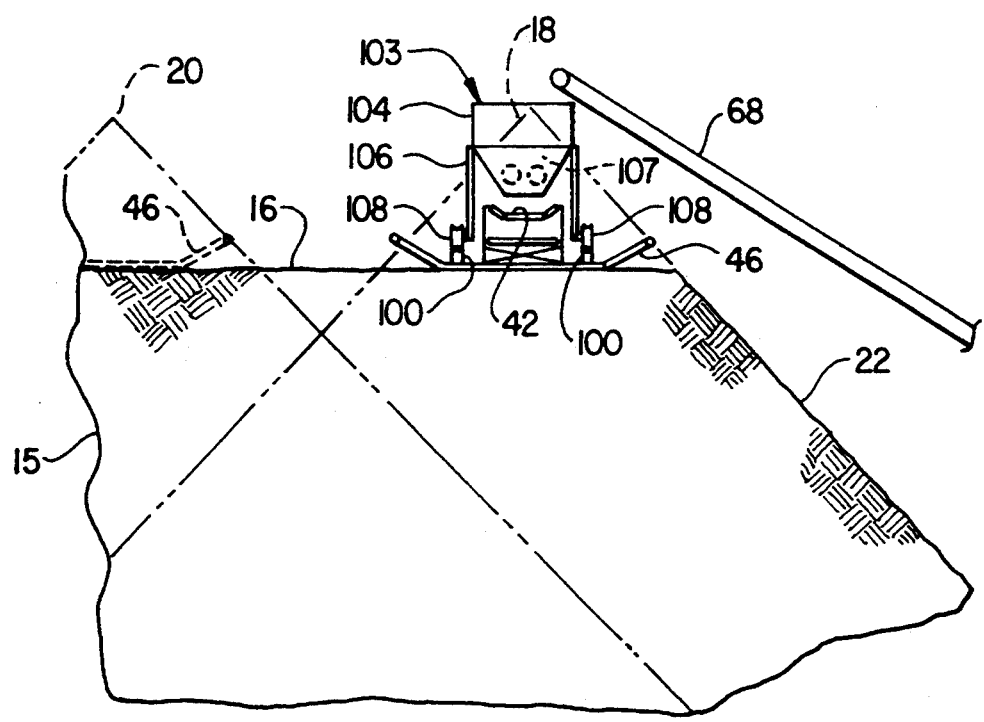
FIG. 4 is a detail side elevation of an alternate embodiment of apparatus for transferring material from one of the excavating conveyors to one of the wing conveyors.

Referring briefly to FIG. 4, there is illustrated an alternate embodiment of mechanism for transferring the excavated material between the conveyor 68 and the conveyor 42. In the arrangement of FIG. 4, the skid or frame 46 is provided with parallel, spaced apart rails 100 on which a material transfer apparatus 103 is disposed. The apparatus 103 includes a suitable material receiving hopper 104 supported by a frame 106 disposed on spaced apart, flanged support wheels 108 which are supported on the rails 100. The apparatus 103 is traversed along the rails 100 as the conveyor 68 progresses in an easterly or westerly direction to transfer material from the conveyor 68 to the conveyor 42. The transfer apparatus 103 may include a material particle size reduction mechanism or crusher 107.

Although a preferred embodiment of the present invention has been described in detail herein, those skilled in the art will recognize that various substitutions and modifications may be made to the method and apparatus of the invention without departing from the scope and spirit of the appended claims.

What is claimed is:

1. A surface mining system for mining material from a mineral seam which has been uncovered of overburden and wherein said overburden has been placed in a spoil pile extending generally parallel to said seam, comprising:
   a first conveyor extending along said spoil pile substantially parallel to said seam;
   a second conveyor in material receiving communication with said first conveyor and extending to a storage site for transferring material thereto;
   an excavator for excavating material from said seam;
   a third conveyor interposed between said excavator and said first conveyor for transferring material from said excavator to said first conveyor; and
   a fourth conveyor extending along said spoil pile generally parallel to said seam and in communication with said second conveyor.

2. The system set forth in claim 1 including:
   a first material particle size reduction apparatus operable to receive material from said excavator for reducing the particle size of said material for transfer to said third conveyor.

3. The system set forth in claim 2 including:
   a second material particle size reduction apparatus interposed between said first conveyor and said second conveyor.

4. The system set forth in claim 2 including:
   a second material particle size reduction apparatus interposed between said excavator and said first particle size reduction apparatus and a fifth conveyor for conveying material from said second particle size reduction apparatus to said first particle size reduction apparatus.

5. The system set forth in claims 4 wherein;
   said second particle size reduction apparatus and said fifth conveyor are mounted for movement along a surface of said seam for receiving material from said excavator and for transferring material to said first particle size reduction apparatus.

6. The system set forth in claim 2 wherein:
   said first particle size reduction apparatus and said third conveyor are disposed on an undercarriage moveable along said seam for transferring material excavated from said seam to said first conveyor.

7. The system set forth in claim 6 including:
   a telescoping material discharge chute interposed between said third conveyor and said first conveyor for discharging material onto said first conveyor irrespective of a change in elevation of said third conveyor with respect to said first conveyor.

8. The system set forth in claim 1 wherein:
   said first conveyor is supported on skid means for movement along said spoil pile in a direction generally transverse to the direction of transport of material by said first conveyor.

9. The system set forth in claim 8 including:

a material-receiving hopper disposed for movement along said skid means for receiving material from said third conveyor for transfer to said first conveyor.

10. The system set forth in claim 9 including:

material particle size reduction apparatus moveable along said skid means for reducing the particle size of material received from said third conveyor.

11. Apparatus for use in conveying particulate material excavated from a mineral seam in a surface mine characterized by:

an undercarriage moveable along a mineral seam for receiving material from said mineral seam;

a frame disposed on said undercarriage;

a conveyor supported on said frame and extending from one side of said undercarriage;

material particle size reducing apparatus disposed on said frame on the opposite side of said undercarriage for counterbalancing the weight of said conveyor; and a telescoping discharge chute disposed at one end of said conveyor for discharging particulate material from said conveyor directly onto a further conveyor.

* * * * *